US012647546B2

(12) United States Patent
Takeuchi

(10) Patent No.: US 12,647,546 B2
(45) Date of Patent: Jun. 2, 2026

(54) CALCULATION METHOD, NON-TRANSITORY COMPUTER-READABLE STORAGE MEDIUM STORING PROGRAM, AND INFORMATION PROCESSING DEVICE

(71) Applicant: SEIKO EPSON CORPORATION, Tokyo (JP)

(72) Inventor: Kota Takeuchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/064,927

(22) Filed: Feb. 27, 2025

(65) Prior Publication Data

US 2025/0280099 A1 Sep. 4, 2025

(30) Foreign Application Priority Data

Feb. 29, 2024 (JP) .................................. 2024-029280

(51) Int. Cl.
*H04N 9/31* (2006.01)
(52) U.S. Cl.
CPC ......... *H04N 9/3194* (2013.01); *H04N 9/3182* (2013.01); *H04N 9/3185* (2013.01)
(58) Field of Classification Search
CPC ...... H04N 9/3194; H04N 9/31; H04N 9/3182; H04N 9/3185; H04N 9/3188; H04N 9/3191; H04N 9/317; H04N 9/3179
USPC .............. 348/744–747, 806, 807; 353/69, 31
See application file for complete search history.

(56) References Cited

U.S. PATENT DOCUMENTS

2013/0258060 A1* 10/2013 Kotake ................ G01C 11/025
348/46

FOREIGN PATENT DOCUMENTS

JP 2013-192098 A 9/2013
JP 2014-187515 A 10/2014

OTHER PUBLICATIONS

"Basic Concepts of the Homography Explained with Code", OpenCV by Doxygen, Nov. 29, 2021.
Ezio Malis and Manuel Vargas, "Deeper Understanding of the Homography Decomposition for Vision-Based Control", HAL Open Science, Sep. 2007.
Zhengyou Zhang, "A Flexible New Technique for Camera Calibration", Technical Report, MSR-TR-98-71, Dec. 2, 1998.

* cited by examiner

*Primary Examiner* — Sherrie Hsia

(74) *Attorney, Agent, or Firm* — Oliff PLC

(57) ABSTRACT

A calculation method is provided, the calculation method including calculation processing of calculating, for each picked-up image, a transformation matrix in which a first corresponding point set in advance in a pattern projected onto a projection surface by a projector and a second corresponding point corresponding to the first corresponding point in each of two or more picked-up images acquired by picking up an image of the projection surface where the pattern is projected, with a camera from two or more positions, are associated with each other, by using the first corresponding point, the second corresponding point, an estimated value of an internal parameter of the camera, and an internal parameter of the projector, and comparing normal vectors of the projection surface calculated from the respective transformation matrices calculated for each picked-up image, thus estimating a normal vector of the projection surface.

9 Claims, 10 Drawing Sheets

FIG. 4

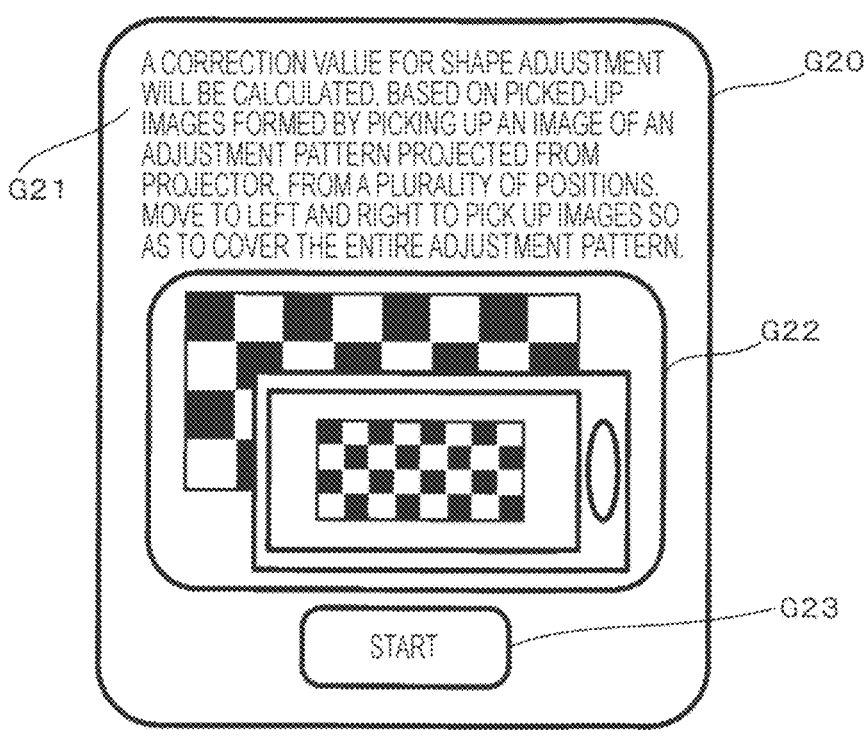

A CORRECTION VALUE FOR SHAPE ADJUSTMENT WILL BE CALCULATED, BASED ON PICKED-UP IMAGES FORMED BY PICKING UP AN IMAGE OF AN ADJUSTMENT PATTERN PROJECTED FROM PROJECTOR, FROM A PLURALITY OF POSITIONS. MOVE TO LEFT AND RIGHT TO PICK UP IMAGES SO AS TO COVER THE ENTIRE ADJUSTMENT PATTERN.

G20

G21

G22

START

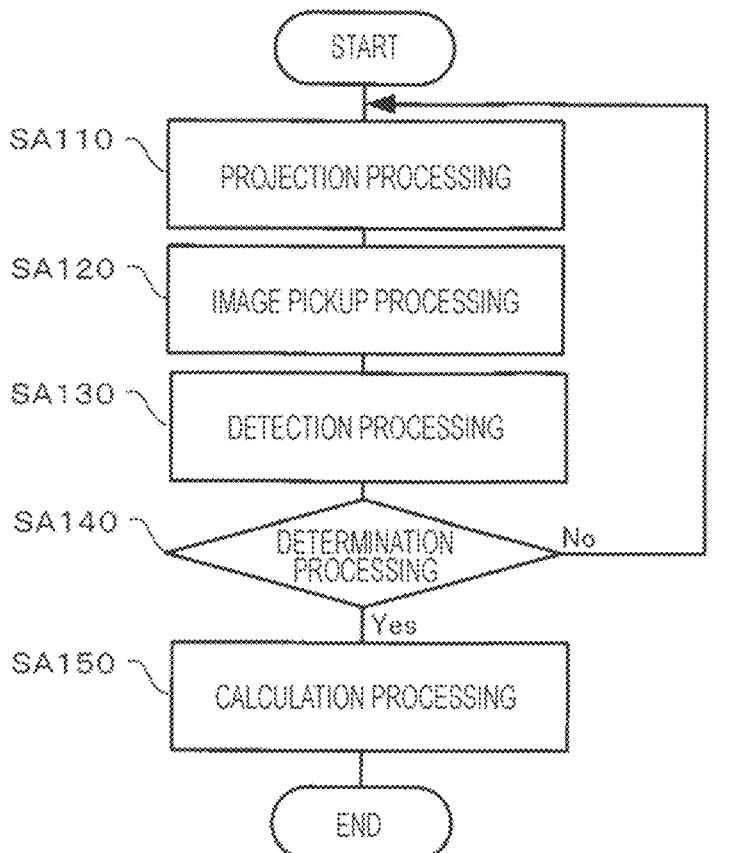

START

SA110 — PROJECTION PROCESSING

SA120 — IMAGE PICKUP PROCESSING

SA130 — DETECTION PROCESSING

SA140 — DETERMINATION PROCESSING — No

Yes

SA150 — CALCULATION PROCESSING

END

*FIG. 9*

PICKED-UP IMAGE # 1

DATA SET A

EXTERNAL PARAMETER

NORMAL VECTOR 1

OR

DATA SET B

EXTERNAL PARAMETER

NORMAL VECTOR 1

PICKED-UP IMAGE # 2

DATA SET A

EXTERNAL PARAMETER

NORMAL VECTOR 2

OR

DATA SET B

EXTERNAL PARAMETER

NORMAL VECTOR 2

PICKED-UP IMAGE # 3

DATA SET A

EXTERNAL PARAMETER

NORMAL VECTOR 3

OR

DATA SET B

EXTERNAL PARAMETER

NORMAL VECTOR 3

PICKED-UP IMAGE # 4

DATA SET A

EXTERNAL PARAMETER

NORMAL VECTOR 4

OR

DATA SET B

EXTERNAL PARAMETER

NORMAL VECTOR 4

CALCULATION METHOD, NON-TRANSITORY COMPUTER-READABLE STORAGE MEDIUM STORING PROGRAM, AND INFORMATION PROCESSING DEVICE

The present application is based on, and claims priority from JP Application Serial Number 2024-029280, filed Feb. 29, 2024, the disclosure of which is hereby incorporated by reference herein in its entirety.

BACKGROUND

1. Technical Field

The present disclosure relates to a calculation method, a non-transitory computer-readable storage medium storing a program, and an information processing device.

2. Related Art

As an example of an image display device, a projector that projects an image on a projection surface such as a projection screen and thus displays the image may be mentioned. Depending on the positional relationship between the projection surface and the image display device, a distortion such as a keystone distortion may occur in the image displayed on a target object by the image display device. Various techniques for correcting the distortion are proposed, and examples thereof include a technique disclosed in JP-A-2014-187515. JP-A-2014-187515 discloses a projector that calculates a normal vector of a projection surface, based on a transformation matrix for projective transformation of an image in a light modulator into a picked-up image picked up by an image pickup unit, and performs distortion correction, based on the normal vector.

JP-A-2014-187515 is an example of the related art.

In the technique disclosed in JP-A-2014-187515, a plurality of normal vectors may be calculated as a solution from one transformation matrix and the calculation accuracy of the normal vectors is not sufficient.

SUMMARY

According to an aspect of the present disclosure, a calculation method includes: projecting a pattern detectable by a camera from a projector onto a planar projection surface; based on a first picked-up image acquired by picking up an image of the pattern with the camera from a first position, calculating a first transformation matrix for transformation from one of a coordinate system of the first picked-up image and a coordinate system of the projector to the other; based on a second picked-up image acquired by picking up an image of the pattern with the camera from a second position different from the first position, calculating a second transformation matrix for transformation from one of a coordinate system of the second picked-up image and the coordinate system of the projector to the other; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector.

According to another aspect of the present disclosure, a non-transitory computer-readable storage medium storing a program is provided, the program causing a computer to execute: projecting a pattern detectable by a camera from a projector onto a planar projection surface onto which an image is projected from the projector; detecting the pattern from each of two or more picked-up images acquired by picking up an image of the projection surface with the camera from two or more positions; calculating a transformation matrix that associates a first corresponding point which is set in advance in the pattern with a second corresponding point corresponding to the first corresponding point in each of the two or more picked-up images, by using the first corresponding point, the second corresponding point, an internal parameter of the camera, and an internal parameter of the projector; and calculating a normal vector of the projection surface, based on the transformation matrix.

According to still another aspect of the present disclosure, an information processing device includes: a communication device that communicates with a projector projecting an image on a planar projection surface; a camera that picks up the image projected on the projection surface from the projector; and a processing device, the processing device executing: projecting a pattern detectable by the camera from the projector onto the projection surface; based on a first picked-up image acquired by picking up an image of the pattern with the camera from a first position, calculating a first transformation matrix for transformation from one of a coordinate system of the first picked-up image and a coordinate system of the projector to the other; based on a second picked-up image acquired by picking up an image of the pattern with the camera from a second position different from the first position, calculating a second transformation matrix for transformation from one of a coordinate system of the second picked-up image and the coordinate system of the projector to the other; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector.

BRIEF DESCRIPTION OF THE DRAWINGS

FIG. 4 shows an example of a UI screen.

FIG. 5 is a flowchart showing a flow of processing in a calculation method executed by a processing device according to a program.

FIG. 9 shows an example of calculation of a normal vector when there is an error in the internal parameter of the camera.

DESCRIPTION OF EMBODIMENTS

In the embodiments described below, various technically preferable limitations are given. However, embodiments of the present disclosure are not limited to the embodiments described below.

1. Embodiment

Figure 1:
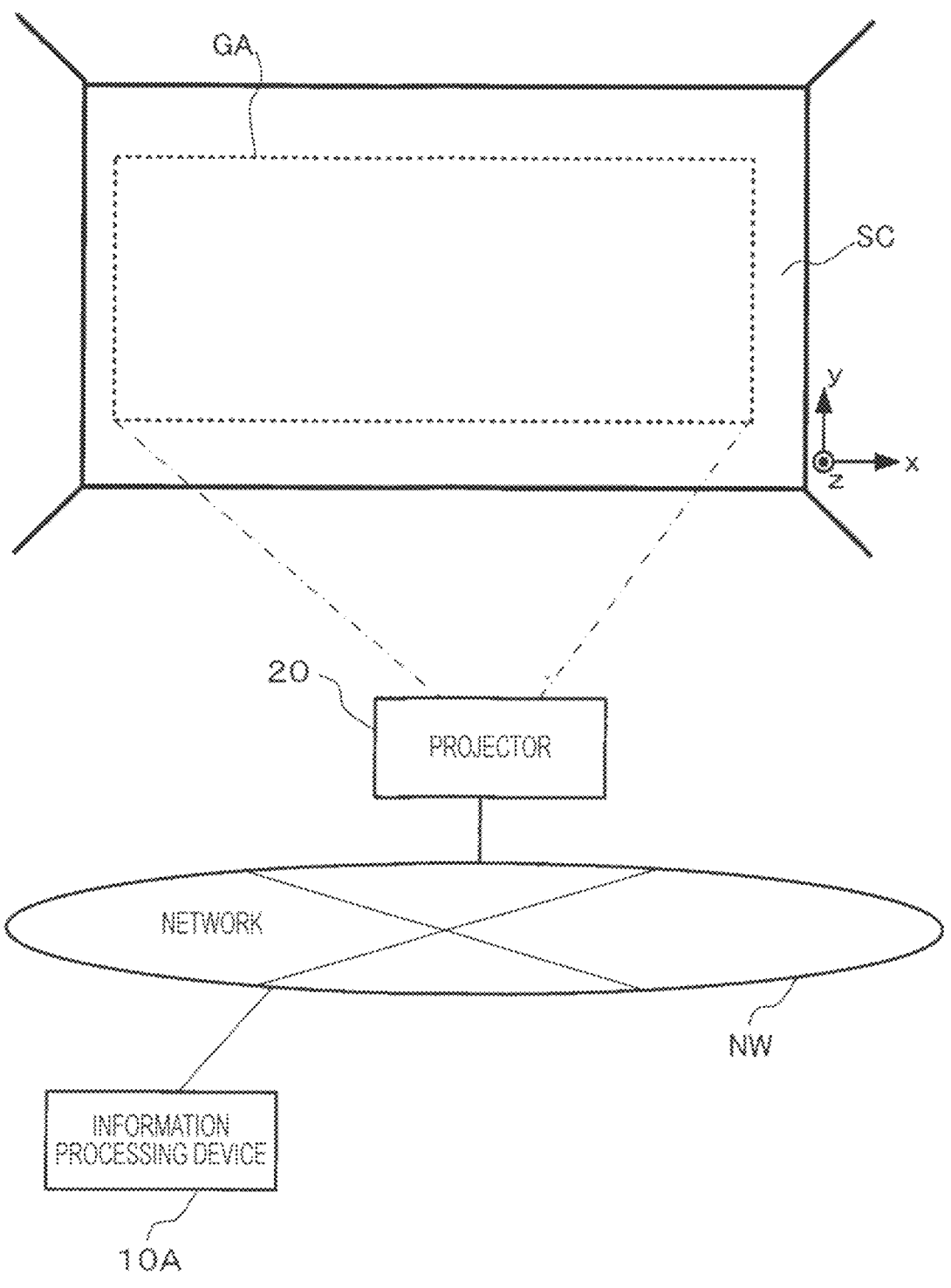
FIG. 1 shows an example of the configuration of a display system including an information processing device according to a first embodiment of the present disclosure.

FIG. 1 shows an example of the configuration of a display system 1 including an information processing device 10A according to a first embodiment of the present disclosure. The display system 1 includes a projector 20 that communicates with the information processing device 10A via a network NW, in addition to the information processing device 10A. As a specific example of the network NW, a wired or wireless local area network (LAN), a wired or wireless USB, or Bluetooth (registered trademark) may be employed.

The projector 20 projects a projection image GA onto a projection surface SC. The projection surface SC in the present embodiment is, for example, one of inner wall surfaces of the room of the user of the display system 1. In FIG. 1, an arrow y indicates a vertical direction, an arrow x indicates one of two directions orthogonal to the vertical direction (hereinafter referred to as a horizontal direction), and a dot z indicates the other of the two directions orthogonal to the vertical direction (hereinafter referred to as a depth direction). The projector 20 includes a light modulator that generates image light corresponding to input image data, such as a liquid crystal panel, and an optical system including a projection lens that guides the image light generated by the light modulator to the projection surface SC, and the like. The projector 20 includes an image processing circuit that corrects a distortion of the projection image according to a geometric correction value provided from the information processing device 10A. In FIG. 1, the light modulator, the optical system, and the image processing circuit are not illustrated.

Figure 2:
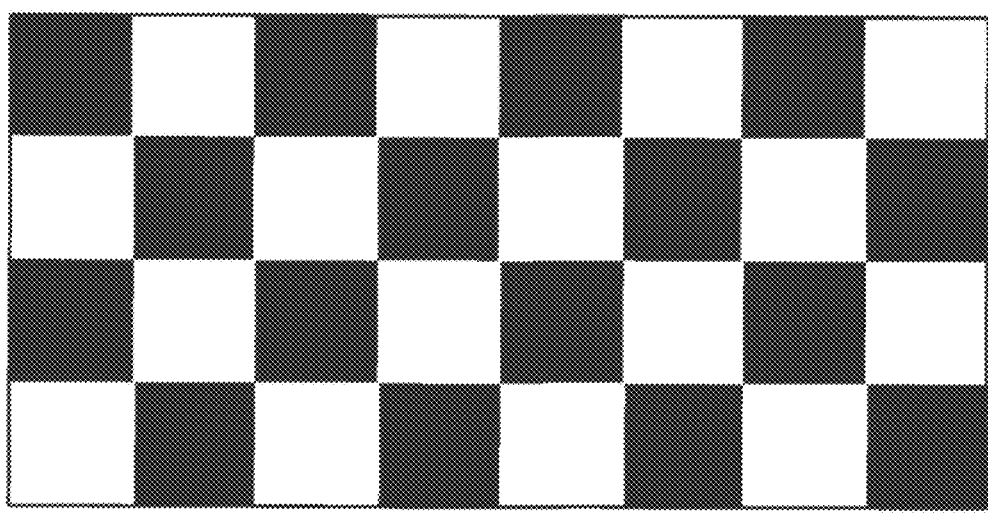
FIG. 2 shows an example of an adjustment pattern projected from a projector onto a projection surface.

The inner wall surface of the room is not flat like a projection screen, and in accordance with a dent or a bump on the projection surface SC, a distortion may occur in the projection image GA displayed on the projection surface SC by the projector 20. Also, when the projection lens of the projector 20 does not face the wall surface straight, a distortion such as a trapezoidal outer shape occurs in the projection image GA displayed on the wall surface by the projector 20. In the present embodiment, the distortion of the projection image GA displayed on the projection surface SC can be corrected, using an adjustment pattern as in the related art. As will be described in detail later, in the present embodiment, a chessboard pattern illustrated in FIG. 2 is used to adjust the outer shape of the projection image GA displayed on the projection surface SC into a rectangular shape.

The information processing device 10A is, for example, a smartphone. The information processing device 10A in the present embodiment is a smartphone, but may be a tablet terminal. The information processing device 10A may be a portable device that can be carried by the user and can move relatively to the projector 20 or the projection surface SC.

Figure 3:
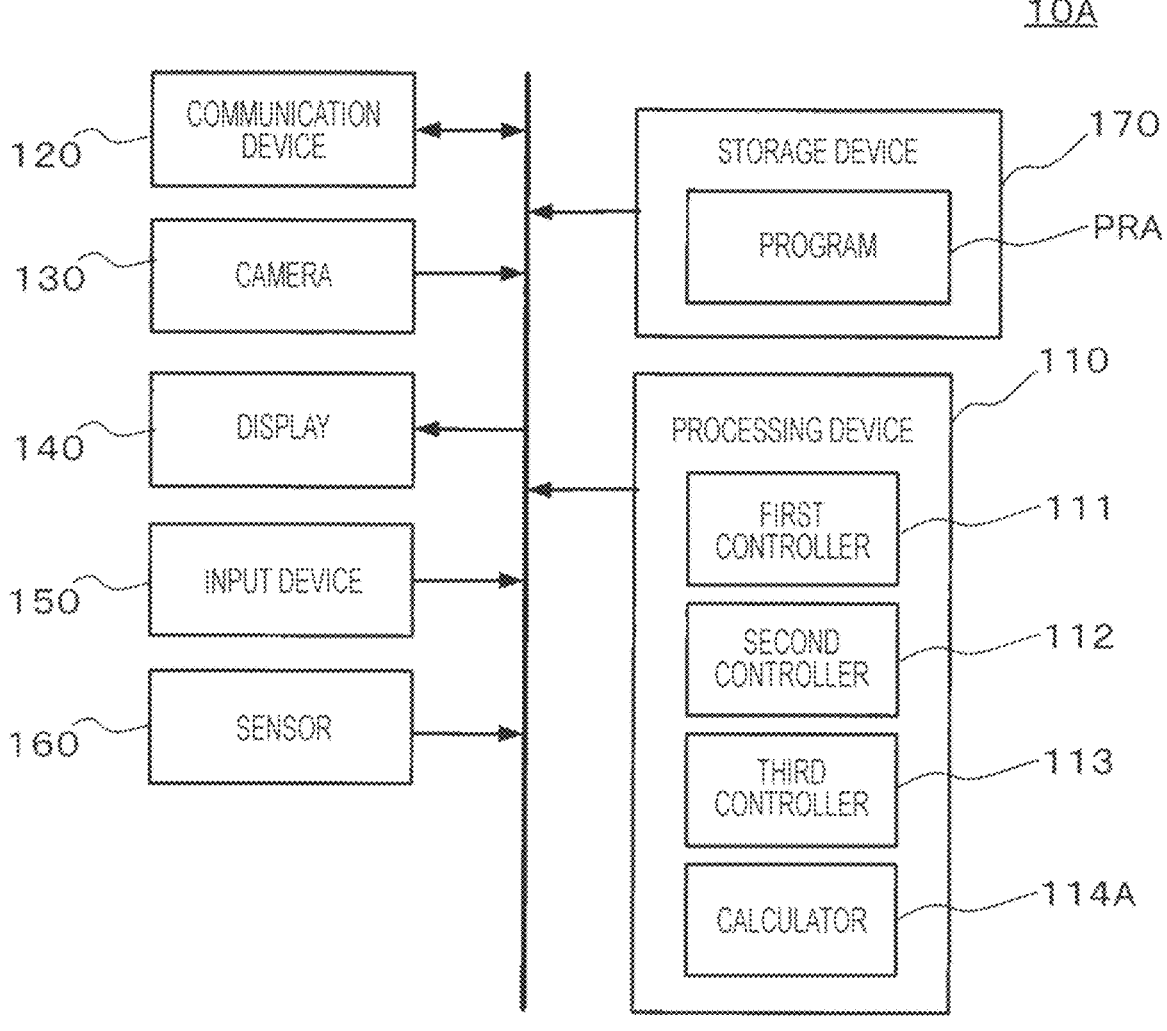
FIG. 3 shows an example of the configuration of the information processing device.

FIG. 3 shows an example of the configuration of the information processing device 10A. As shown in FIG. 3, the information processing device 10A includes a processing device 110, a communication device 120, a camera 130, a display 140, an input device 150, a sensor 160, and a storage device 170. In the information processing device 10A, each of the communication device 120, the camera 130, the display 140, the input device 150, the sensor 160, and the storage device 170 is coupled to the processing device 110 via a bus.

The processing device 110 is one or more processors. The processing device 110 is, for example, a central processing unit (CPU). The processing device 110 operates according to a program PRA stored in the storage device 170 and thus functions as a control center of the information processing device 10A.

The communication device 120 is a device that wirelessly communicates with another device and includes, for example, an interface circuit. A specific example of the another device that communicates with the communication device 120 is the projector 20.

The camera 130 is, for example, a video camera. The camera 130 includes an image pickup lens, not illustrated, and an image pickup element, not illustrated, where light from the image pickup lens forms an image. The image pickup element is, for example, a complementary metal-oxide-semiconductor (CMOS) sensor, but is not particularly limited. The camera 130 is a device for picking up a projection image projected from the projector 20 onto a target object. The camera 130 picks up an image in an image pickup field of view as needed, and transfers image data representing the picked-up image to the processing device 110.

The display 140 includes, for example, a panel display such as a liquid crystal display, a plasma display, or an organic EL display, and a drive circuit thereof. The display 140 displays various images under the control of the processing device 110. The input device 150 is a transparent pressure sensor provided to cover the display area of the display 140. The input device 150 may include a plurality of handlers. The input device 150 accepts a user's operation and outputs operation content data indicating the accepted operation to the processing device 110. Thus, the user's operation to the input device 150 is transmitted to the processing device 110.

The sensor 160 is, for example, a three-axis acceleration sensor. The sensor 160 detects an acceleration generated in the information processing device 10A in each of three axial directions orthogonal to each other, and outputs acceleration data representing the acceleration in each axial direction to the processing device 110. The acceleration data is analyzed, and the direction of the gravitational acceleration with respect to the information processing device 10A, that is, the vertical direction, can thus be detected.

The storage device 170 is a recording medium readable by the processing device 110. The storage device 170 includes, for example, a nonvolatile memory and a volatile memory. The nonvolatile memory is, for example, a read-only memory (ROM), an erasable programmable read-only memory (EPROM), or an electrically erasable programmable read-only memory (EEPROM). The volatile memory is, for example, a random-access memory (RAM). Various programs are stored in the nonvolatile memory. Examples of the various programs stored in the nonvolatile memory include a kernel program and the program PRA. In FIG. 3, the kernel program is not illustrated. The kernel program is a program for causing the processing device 110 to implement an operating system (OS). In response to the power of the information processing device 10A being turned on, the processing device 110 reads the kernel program from the nonvolatile memory to the volatile memory and starts executing the read kernel program. In response to an instruction to start executing another program that is given by an operation to the input device 150, the processing device 110 operating according to the kernel program starts executing the another program.

For example, when being instructed to start executing the program PRA by the operation to the input device 150, the processing device 110 reads the program PRA from the nonvolatile memory to the volatile memory and starts executing the program PRA read into the volatile memory. The processing device 110 operating according to the program PRA functions as a first controller 111, a second controller 112, a third controller 113, and a calculator 114A illustrated in FIG. 3. That is, each of the first controller 111, the second controller 112, the third controller 113, and the calculator 114A illustrated in FIG. 3 is a software module implemented by causing the processing device 110 to operate according to the program PRA. The first controller 111, the second controller 112, the third controller 113, and the calculator 114A illustrated in FIG. 3 have the following roles.

The first controller 111 displays, on the display 140, an image of a UI screen that prompts the user to execute the calculation method according to the present disclosure. A specific example of the UI screen displayed on the display 140 under the control of the first controller 111 may be a UI screen that prompts the user to pick up an image of the projection surface SC in the state where an adjustment pattern is projected from the projector 20, using the camera 130 from two or more different positions. For example, the UI screen prompts the user to pick up an image of the adjustment pattern with the camera 130 in the state where the camera 130 is located at a first position, and to pick up an image of the adjustment pattern with the camera 130 in the state where the camera 130 is located at a second position different from the first position. The picked-up image acquired in the state where the camera 130 is located at the first position is an example of a first picked-up image, and the picked-up image acquired in the state where the camera 130 is located at the second position is an example of a second picked-up image. Each of the two or more positions is a position of the camera 130 in relation to the projector 20 as a reference object.

FIG. 4 shows an example of a UI screen G20 in the present embodiment. The UI screen G20 includes a character string image G21 showing an explanatory text related to the adjustment of the outer shape of the projection image, an image G22 schematically showing the image pickup of the adjustment pattern using the information processing device 10A, and a button image G23 for causing the user to give an instruction to execute the adjustment. In the state where the UI screen G20 is displayed on the display 140, the user can perform an operation of selecting the image G23 by an operation on the input device 150. When the image G23 is selected by the operation on the input device 150, the control to cause the projector 20 to project the adjustment pattern is executed by the second controller 112, described later, and the processing of causing the camera 130 to pick up an image of the adjustment pattern is executed by the third controller 113.

The second controller 112 communicates with the projector 20 via the communication device 120 and thus causes the projector 20 to project the foregoing adjustment pattern.

The third controller 113 controls the camera 130 to pick up an image including the adjustment pattern projected on the projection surface SC at a predetermined period such as a period of several milliseconds. The user is prompted to pick up an image of the adjustment pattern while moving to the left and right, based on the image G21, and therefore in the process in which the user moves to the left and right while holding the camera 130 toward the projection surface SC, an image of the adjustment pattern displayed on the projection surface SC is picked up by the camera 130 at a plurality of image pickup positions at different positions, and a plurality of picked-up images can be picked up at each image pickup position. The plurality of image pickup positions include a first position and a second position.

The calculator 114A analyzes each of the plurality of picked-up images picked up by the camera 130 and thus detects the adjustment pattern from each picked-up image. Subsequently, the calculator 114A executes calculation processing of estimating a normal vector of the projection surface SC, based on each adjustment pattern detected from the plurality of picked-up images, and calculating a geometric correction value for correcting the shape of the projection image into a rectangular shape, based on the estimated normal vector. The normal vector of the projection surface SC is a vector in the depth direction z, that is, a direction perpendicular to the projection surface SC. Processing details of the calculation processing will be described later.

When an instruction to execute the distortion correction is given by the user visually recognizing the above-described UI screen, the processing device 110 operating in accordance with the program PRA executes the calculation method clearly representing the features of the present disclosure. FIG. 5 is a flowchart showing a flow of processing in this calculation method. As shown in FIG. 5, the calculation method includes projection processing SA110, image pickup processing SA120, detection processing SA130, determination processing SA140, and calculation processing SA150.

In the projection processing SA110, the processing device 110 functions as the second controller 112. In the projection processing SA110, the projector 20 is made to project the above-described adjustment pattern. In the image pickup processing SA120, the processing device 110 functions as the third controller 113. In the image pickup processing SA120, the processing device 110 causes the camera 130 to pick up an image of the adjustment pattern projected on the projection surface SC. As the user holding the information processing device 10A in a hand moves to the left or right in relation to the projection surface SC while causing the camera 130 of the information processing device 10A to face the projection surface SC during the execution of the image pickup processing SA120, a plurality of picked-up images are picked up by the camera 130 at a plurality of different image pickup positions.

In the detection processing SA130, the determination processing SA140, and the calculation processing SA150, the processing device 110 functions as the calculator 114A. In the detection processing SA130, the processing device 110 analyzes each of the plurality of picked-up images picked up by the camera 130 and thus detects the adjustment pattern from each picked-up image. More specifically, in the detection processing SA130, the processing device 110 detects, for each picked-up image, a plurality of first corresponding points, which are predetermined points in the adjustment pattern drawn on the light modulator. The first corresponding point may be a natural feature point.

In the determination processing SA140, the processing device 110 determines whether the adjustment pattern is detected from two or more picked-up images in the detection processing SA130. When the adjustment pattern is detected from two or more picked-up images in the detection processing SA130, the determination result of the determination processing SA140 is "Yes". In contrast, when the number of picked-up images in which the adjustment pattern is detected in the detection processing SA130 is fewer than two, the determination result of the determination processing SA140 is "No". When the determination result of the determination processing SA140 is "No", the processing device 110 executes again the processing from the projection processing SA110 onward. In contrast, when the determination result of the determination processing SA140 is "Yes", the processing device 110 executes the calculation processing SA150 and ends the calculation method.

Figure 6:
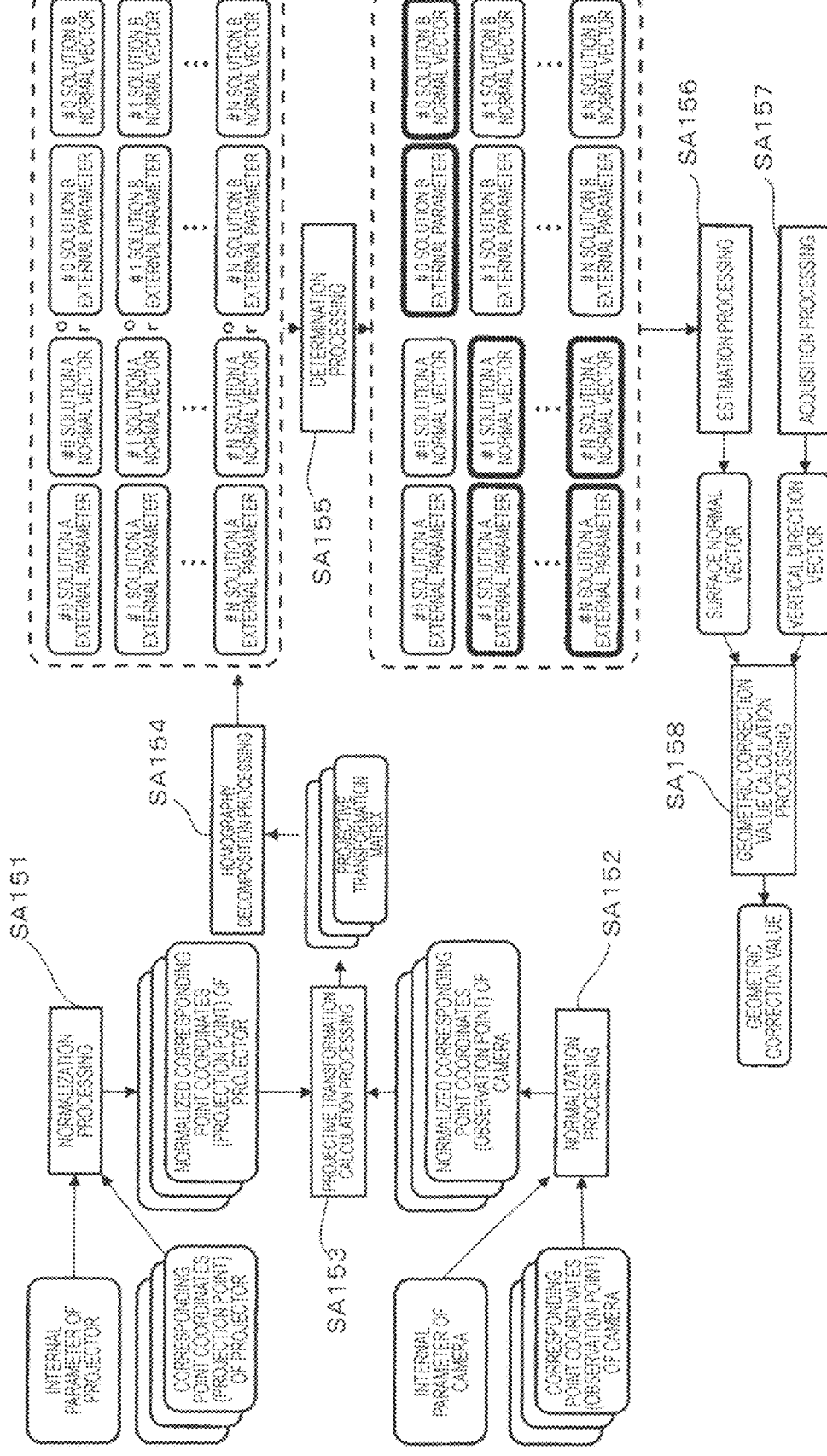
FIG. 6 illustrates processing details of calculation processing.

In the calculation processing SA150, the processing device 110 functions as the calculator 114A. FIG. 6 illustrates processing details of the calculation processing SA150. A rectangle in FIG. 6 represents processing executed by the calculator 114A, and a rectangle with rounded corners represents data to be input or output in each processing. As shown in FIG. 6, the calculation processing SA150 includes normalization processing SA151, normalization processing SA152, projective transformation calculation processing SA153, homography decomposition processing SA154, determination processing SA155, estimation processing SA156, acquisition processing SA157, and geometric correction value calculation processing SA158. In the calculation processing SA150, processing that is not necessary for estimating the normal vector of the projection surface SC, such as the acquisition processing SA157 and the geometric correction value calculation processing SA158, may be omitted.

In the normalization processing SA151, using an internal parameter of the projector 20, the calculator 114A transforms the coordinates of the first corresponding point in a projector coordinate system indicating a position on the projection image projected from the projector 20 into normalized coordinates that do not include a component corresponding to the internal parameter. It can also be said that the projector coordinate system is a two-dimensional coordinate system for representing the coordinates of each pixel in the light modulator. The projector coordinate system is an example of the coordinate system of the projector. Thus, the coordinates of the first corresponding point are the coordinates of the pixel in the light modulator. The internal parameter of the projector is data representing components of the angle of view, the lens center, and the lens distortion of the projection lens of the projector, and specifically, includes the focal length f of the projection lens, the lens center $(C_u, C_v)$, and the lens coefficients k1 and k2. The calculator 114A may acquire the internal parameter from the projector 20 by communicating with the projector 20, or may acquire the internal parameter input by the user through an operation to the input device 150, using a value listed in a brochure or the like.

The coordinates $(u_n, v_n)$ of the corresponding point in the projector coordinate system and the normalized coordinates $(x_n, y_n)$ of the corresponding point have the relationships expressed by in the equations 1 and 2 given below. The calculator 114A transforms the coordinates of the first corresponding point in the projector coordinate system indicating the position on the projection image projected by the projector 20 into normalized coordinates, using the equations (1) and (2) given below.

$$x'_n = \frac{u_n - c_u}{f}, \; y'_n = \frac{v_n - c_v}{f} \tag{1}$$

$$\begin{pmatrix} (x_n^2 + y_n^2)x_n & (x_n^2 + y_n^2)^2 x_n \\ (x_n^2 + y_n^2)y_n & (x_n^2 + y_n^2)^2 y_n \end{pmatrix} \begin{pmatrix} k_1 \\ k_2 \end{pmatrix} = \begin{pmatrix} x'_n - x_n \\ y'_n - y_n \end{pmatrix} \tag{2}$$

In the normalization processing SA152, using an internal parameter of the camera 130, the calculator 114A transforms the coordinates of the second corresponding point in a camera coordinate system for indicating a position on the picked-up image picked up by the camera 130 into normalized coordinates that do not include a component corresponding to the internal parameter. It can also be said that the camera coordinate system is a two-dimensional coordinate system for representing the coordinates of each pixel in the image pickup element, that is, the coordinates of each pixel of the picked-up image. Thus, the coordinates of the second corresponding point are the coordinates of the pixel in the picked-up image. The camera coordinate system for indicating the position on the picked-up image picked up by the camera 130 positioned at the first position is an example of the coordinate system of the first picked-up image, and the camera coordinate system for indicating the position on the picked-up image picked up by the camera 130 positioned at the second position is an example of the coordinate system of the second picked-up image. The internal parameter of the camera refers to data representing the components of the angle of view, the lens center, and the lens distortion of the image pickup lens of the camera, and specifically refers to the focal length, the lens center, and the lens coefficient of the image pickup lens. The information processing device 10A in the present embodiment is a smartphone, and the user generally cannot grasp the internal parameter of a camera provided in the smartphone even if the smartphone is owned by the user. Therefore, the calculator 114A performs the calculation using the above-described Equations (1) and (2) using an estimated value of the internal parameter of the camera 130 (for example, the internal parameter of the camera provided in a general smartphone), and thus calculates the normalized coordinates of the second corresponding point.

In the projective transformation calculation processing SA153, the calculator 114A calculates a projective transformation matrix, which is a transformation matrix for transforming the normalized coordinates of the first corresponding point into the normalized coordinates of the second corresponding point, based on the normalized coordinates of the first corresponding point and the normalized coordinates of the second corresponding point. That is, the calculator 114A executes: calculating a first transformation matrix for transformation from one of the coordinate system of the first picked-up image and the coordinate system of the projector to the other, based on the first picked-up image acquired by picking up an image of the adjustment pattern with the camera 130 from the first position; and calculating a second transformation matrix for transformation from one of the coordinate system of the second picked-up image and the coordinate system of the projector to the other, based on the second picked-up image acquired by picking up an image of the adjustment pattern with the camera 130 from the second position different from the first position. The projective transformation matrix is an example of the first transformation matrix or the second transformation matrix. For the calculation of the projective transformation matrix, an existing algorithm may be used as appropriate.

Figure 7:
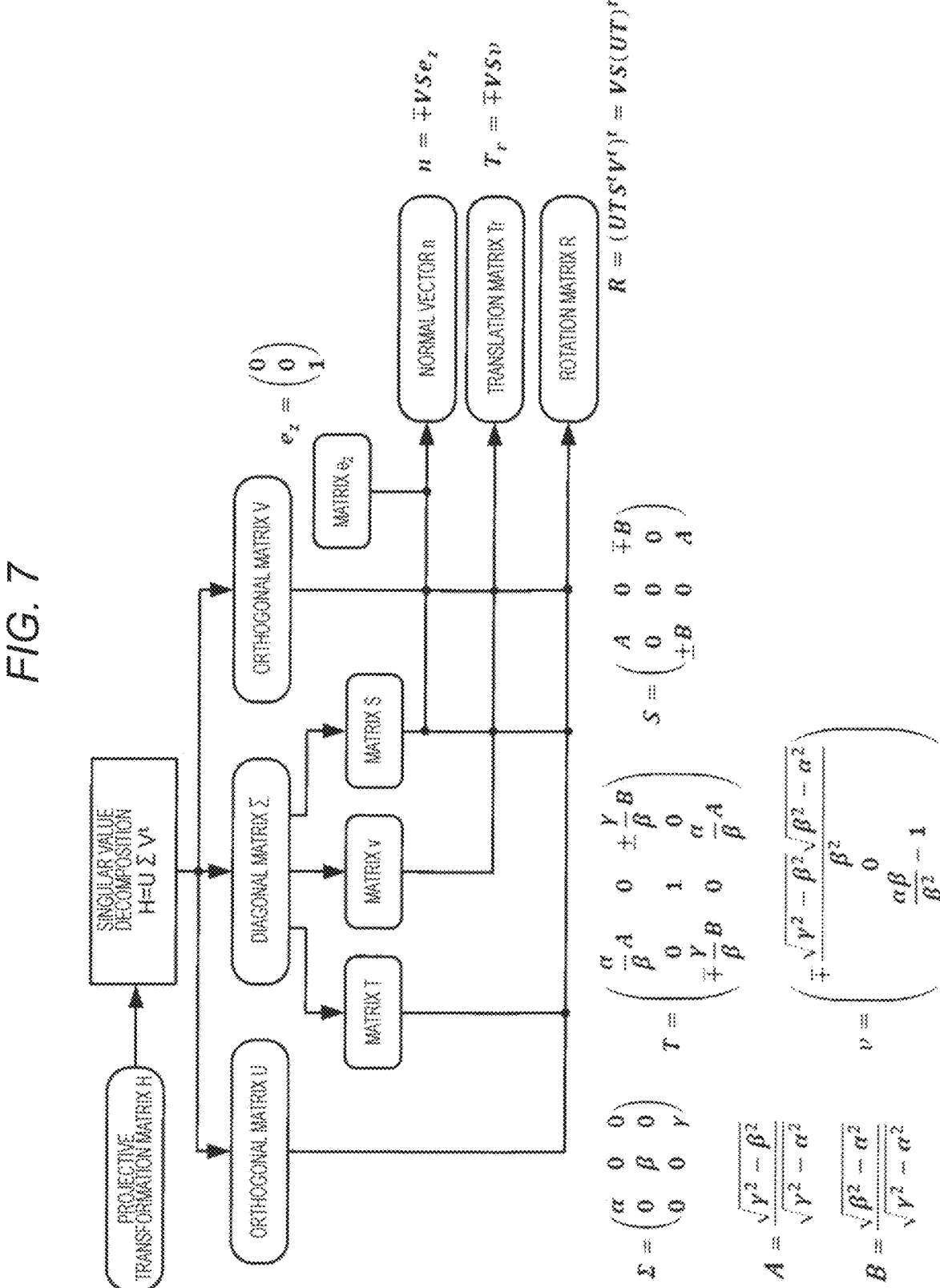
FIG. 7 illustrates homography decomposition processing.

In the homography decomposition processing SA154, the calculator 114A performs homography decomposition shown in FIG. 7 on each of a plurality of projective transformation matrices calculated based on each of a plurality of picked-up images, that is, the first transformation matrix and the second transformation matrix, and thus generates a data set including a normal vector of the projection surface SC and data indicating a relative position of the camera 130 in relation to the projection surface SC (external parameter of the camera 130). The external parameter of the camera 130 refers to a translation matrix and a rotation matrix of the camera 130. As shown in FIG. 7, two data sets are acquired from one projective transformation matrix. That is, when the number of picked-up images in which the adjustment pattern is successfully detected is N (N being an integer equal to or greater than 2), the calculator 114A calculates 2N data sets, each data set including a normal vector of the projection surface SC and an external parameter of the camera 130, from the N picked-up images.

Figure 8:
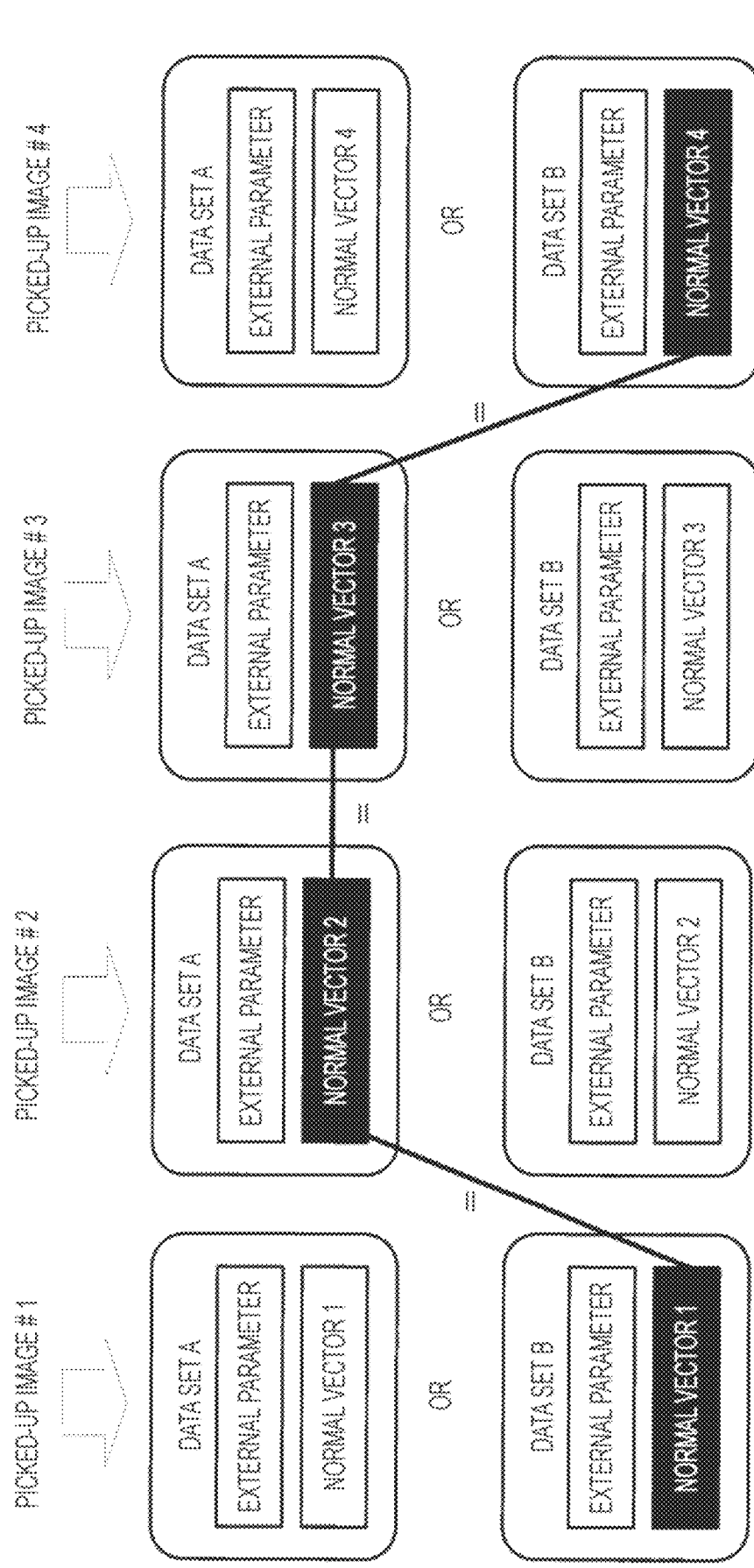
FIG. 8 shows an example of calculation of a normal vector when there is no error in an internal parameter of a camera.

In the present embodiment, since the projection surface SC is immobile or substantially immobile in relation to the projector 20, the direction and magnitude of the normal vector of the projection surface SC are substantially unchanged. Thus, when the internal parameter of the camera 130 has a truly correct value, the 2N data sets include N data sets whose normal vectors coincide with each other, as shown in FIG. 8, and the normal vectors correctly represent the normal direction of the projection surface SC. In FIG. 8, the data sets in which the foreground color and the background color are reversed are data sets whose normal vectors coincide with each other. However, the internal parameter of the camera 130 in the present embodiment has an estimated value and includes an error from the true value. Therefore, as shown in FIG. 9, the 2N data sets include N data sets including similar normal vectors, but the normal vectors do not completely coincide with each other. The data sets hatched in FIG. 9 are data sets including normal vectors similar to each other. Thus, in the present embodiment, the calculator 114A performs the determination processing SA155 on the 2N data sets and thus selects N data sets estimated to include a normal vector approximate to a correct normal vector. More specifically, in the determination processing SA155, the calculator 114A performs, for example, dynamic programming on the 2N data sets and thus compares the normal vectors included in each of the two data sets calculated from one picked-up image between the picked-up images, and selects a path that minimizes the sum of the differences between the normal vectors included in the picked-up images. In FIG. 6, a data set with a gray background color means a data set that is not selected in the determination processing SA155.

In the estimation processing SA156, the calculator 114A estimates the average of the N normal vectors in the data set on the path, as the normal vector of the projection surface SC. The average of the N normal vectors is, for example, an arithmetic average for each component. That is, in the estimation processing SA156, the calculator 114A compares the plurality of normal vectors respectively calculated based on the plurality of picked-up images, and thus estimates the normal vector of the projection surface SC. In other words, in the estimation processing SA156, the calculator 114A estimates the normal vector of the projection surface SC, based on the first normal vector of the projection surface SC calculated based on the first transformation matrix and the second normal vector of the projection surface SC calculated based on the second transformation matrix.

In the acquisition processing SA157, the calculator 114A acquires a vertical direction vector representing the vertical direction, based on output data from the sensor 160. In the geometric correction value calculation processing SA158, the calculator 114A calculates the outer product (vector product) of the vertical direction vector and the normal vector estimated in the estimation processing SA156, and thus calculates a horizontal direction vector orthogonal to the normal vector and orthogonal to the vertical vector. The horizontal direction vector and the vertical vector prescribe a screen coordinate system, which is a two-dimensional coordinate system prescribing a position on the projection surface SC when the projection surface SC is viewed from the front. Subsequently, the calculator 114A calculates a mutual transformation matrix of the projector coordinate system and the screen coordinate system. The calculator 114A determines the coordinates of the four corners of the projection image after correction, so as to form a rectangle on the projection surface SC, and transforms the coordinates into coordinates in the projector coordinate system, using the mutual transformation matrix. Then, the calculator 114A calculates a geometric correction value for distortion correction from the coordinates of the four corners in the projector coordinate system and the coordinates of the four corners of the projection image. As the geometric correction value is calculated in consideration of the vertical direction vector, a projection image that is straight in relation to the installation surface for the projection target object having the projection surface SC (for example, the ground) is acquired.

The calculator 114A transmits the geometric correction value calculated in the above-described manner to the projector 20, using the communication device 120, and causes the projector 20 to execute processing of performing correction according to the geometric correction value and projecting the projection image GA.

According to the present embodiment, even when a plurality of candidate vectors serving as candidates for the normal vector are calculated from one picked-up image, a correct candidate vector can be selected. Also, according to the present embodiment, even when the internal parameter of the camera 130 cannot be grasped in advance, the normal vector of the projection surface SC can be accurately estimated, and the accuracy of the geometric correction is improved in correcting the outer shape of the projection image GA as viewed from a direction along the normal vector, that is, the outer shape of the projection image GA when the projection surface SC is viewed from the front, to a rectangle.

2. Second Embodiment

Figure 10:
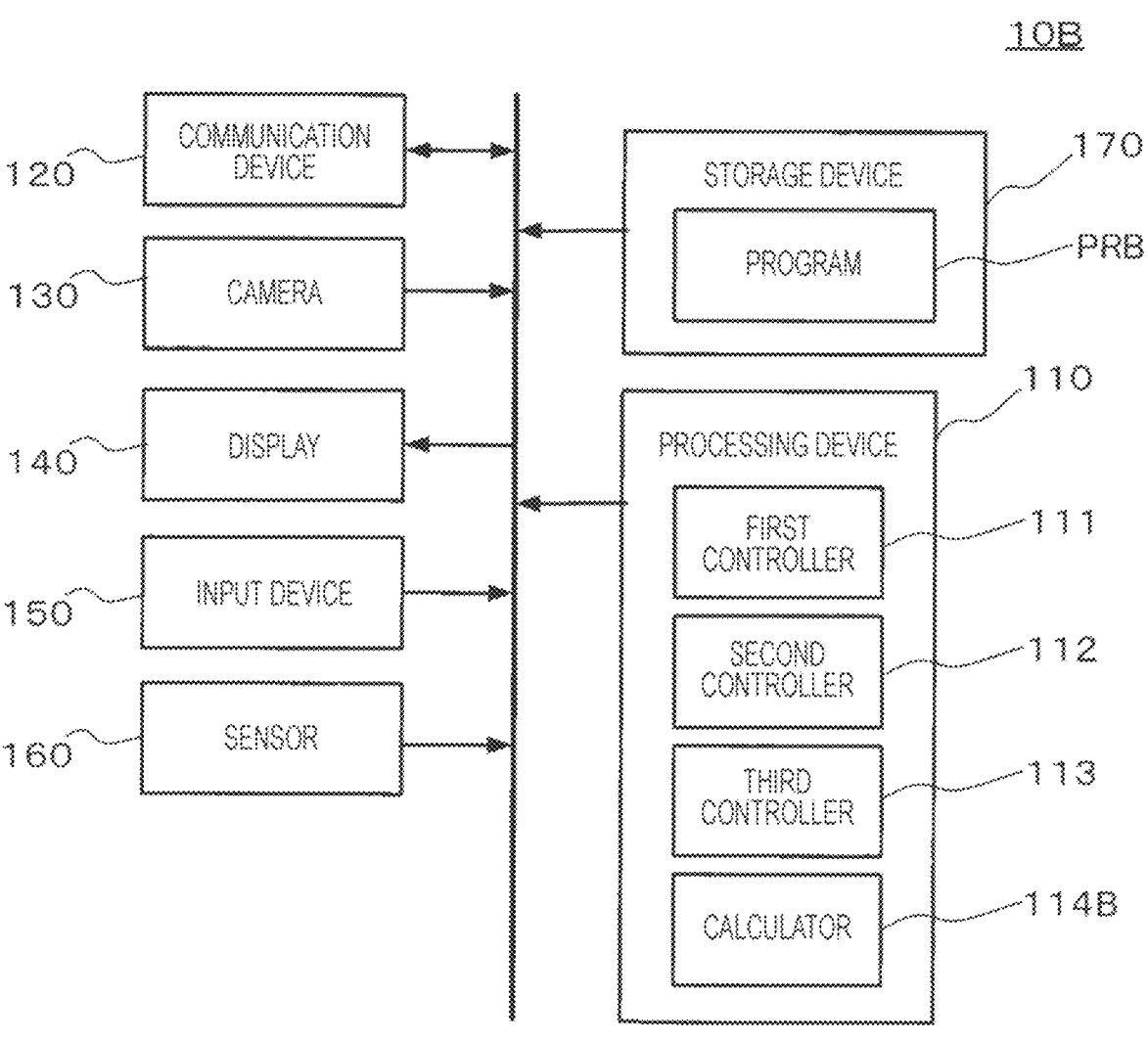
FIG. 10 shows an example of the configuration of an information processing device according to a second embodiment of the present disclosure.

FIG. 10 illustrates an example of the configuration of an information processing device 10B according to a second embodiment of the present disclosure. In FIG. 10, the same elements as in FIG. 3 are denoted by the same reference signs. As is clear from the comparison between FIG. 10 and FIG. 3, the hardware configuration of the information processing device 10B is the same as the hardware configuration of the information processing device 10A. That is, the information processing device 10B includes a processing device 110, a communication device 120, a camera 130, a display 140, an input device 150, a sensor 160, and a storage device 170. The difference between the configuration of the information processing device 10B and the configuration of the information processing device 10A is that a program PRB is stored in the storage device 170 instead of the program PRA.

Figure 11:
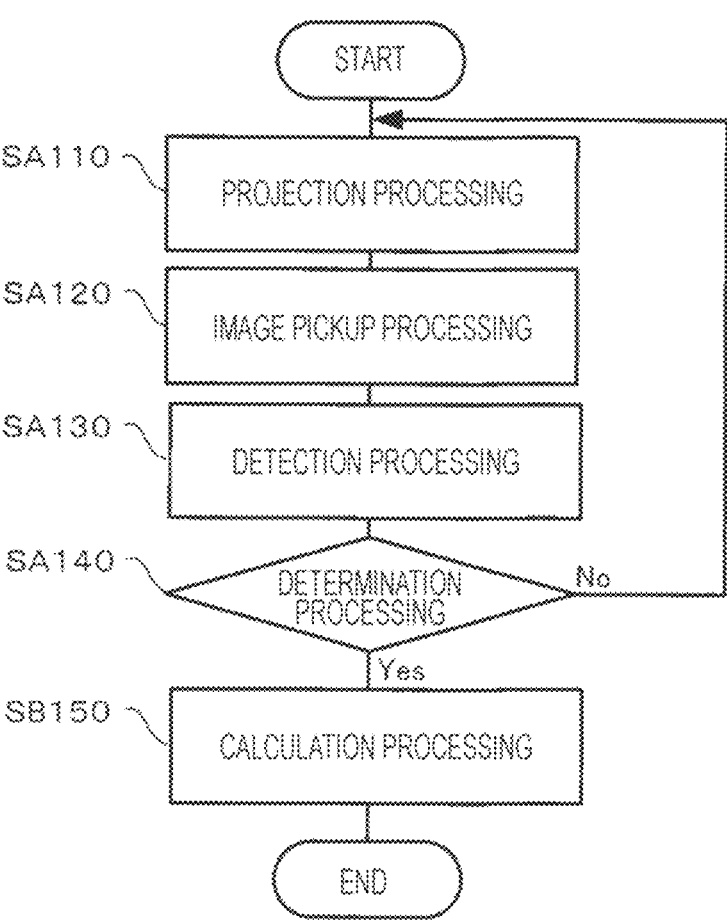
FIG. 11 is a flowchart showing a flow of processing in a calculation method executed by a processing device according to a program.

The processing device 110 operating according to the program PRB functions as a first controller 111, a second controller 112, a third controller 113, and a calculator 114B illustrated in FIG. 10. In addition, the processing device 110 operating according to the program PRB executes a calculation method whose processing flow is shown in the flowchart illustrated in FIG. 11. In FIG. 11, the same processing steps as in FIG. 5 are denoted by the same reference signs. As is clear from the comparison between FIG. 11 and FIG. 5, the calculation method according to the present embodiment is different from the calculation method according to the first embodiment in that the method includes calculation processing SB150 instead of the calculation processing SA150. The calculation processing SB150 and the calculator 114B, which are the differences from the first embodiment, will be mainly described below.

In the calculation processing SB150, the processing device 110 functions as the calculator 114B. The calculator 114B is the same as the calculator 114A in that the above-described transformation matrix is calculated, based on the picked-up image of the adjustment pattern picked up by the camera 130, and that the normal vector of the projection surface SC is calculated, based on the transformation matrix. The calculator 114B is different from the calculator 114A in that the estimation of the internal parameter of the camera and the update of the normal vector based on the result of estimation are repeated so as to minimize the reprojection error calculated from the transformation matrix calculated from each of the two or more picked-up images.

The reprojection error refers to a difference between actually observed point cloud coordinates and point cloud coordinates acquired by reproducing the point cloud coordinates in question. In the present embodiment, the "actually observed point cloud coordinates" are the coordinates of the second corresponding point in the picked-up image. In the present embodiment, the "point cloud coordinates acquired by reproducing the point cloud coordinates in question" are coordinates acquired by transforming the coordinates in the screen coordinates system acquired by performing the normalization and the transformation according to the mutual transformation matrix, of each of the first corresponding points in the projector coordinate system, further into the camera coordinate system. When the internal parameter, the external parameter, and the surface normal vector of the projection surface SC are correct, the reprojection error is zero. Thus, the reprojection error is an indicator of whether the estimation accuracy of the internal parameter, the external parameter, and the surface normal vector of the projection surface SC is good or poor.

Figure 12:
FIG. 12 illustrates processing details of calculation processing.

FIG. 12 illustrates processing details of the calculation processing SB150. In FIG. 12, the same processing steps as in FIG. 6 are denoted by the same reference signs. As is clear from the comparison between FIG. 12 and FIG. 6, the calculation processing SB150 includes normalization processing SA151, normalization processing SA152, projective transformation calculation processing SA153, homography decomposition processing SA154, determination processing SA155, and estimation processing SA156. Although not shown in detail in FIG. 12, the calculation processing SB150 also includes acquisition processing SA157 and geometric correction value calculation processing SA158. The calculation processing SB150 is different from the calculation processing SA150 in that the calculation processing SB150 includes reprojection error calculation processing SB151, determination processing SB152, and update processing SB153.

In the reprojection error calculation processing SB151, the calculator 114B calculates the reprojection error, using the transformation matrix calculated from each of two or more picked-up images, the internal parameter (estimated value) of the camera 130, and the internal parameter of the projector 20. In the determination processing SB152, the calculator 114B determines whether the reprojection error calculated in the reprojection error calculation processing SB151 is minimized. In the present embodiment, when the reprojection error is less than a predetermined threshold, the calculator 114B determines that the reprojection error is minimized, and the determination result of the determination processing SB152 is "Yes". As the threshold value, a suitable value may be set by an experiment or the like. When the reprojection error is equal to or greater than the predetermined threshold, the determination result of the determination processing SB152 is "No".

When the determination result of the determination processing SB152 is "No", the calculator 114B performs the update processing SB153 of updating the internal parameter (estimated value) of the camera 130, and then executes again the processing from the normalization processing SA152 onward. As a specific example of the update mode of the internal parameter (estimated value) of the camera 130, for example, in the case of the focal length f, it is conceivable to perform round-robin-type update in which the focal length is sequentially raised from an initial value (1000) to 1010, 1020, and the like (or sequentially lowered from the initial value (1000) to 990, 980 . . . , and the like), or update based on nonlinear optimization in which the amount of increase or decrease is adjusted according to the magnitude and sign of the difference between the threshold value and the reprojection error. In contrast, when the determination result of the determination processing SB152 is "Yes", the calculator 114B executes the acquisition processing SA157 and the geometric correction value calculation processing SA158 described above, and ends the execution of the calculation method.

As described above, according to the present embodiment, even when the internal parameter of the camera 130 is not known, the estimation of the internal parameter of the camera 130 and the update of the normal vector based on the result of estimation are repeated so that the reprojection error calculated from the plurality of projective transformation matrices calculated from the respective picked-up images is minimized. Therefore, according to the present embodiment, the normal vector of the projection surface SC can be estimated more accurately than in the first embodiment, and the geometric correction of correcting the outer shape of the projection image GA as viewed from the direction along the normal vector, that is, the outer shape of the projection image GA when the projection surface SC is viewed from the front, into a rectangular shape, can be performed more accurately than in the first embodiment. In addition, according to the present embodiment, the internal parameter of the camera 130 can be estimated.

3. Modification Examples

Each of the above embodiments may be modified as follows.

(1) In the first embodiment, the processing device 110 executing the calculation method clearly representing the features of the present disclosure is provided in the information processing device 10A, which is separate from the projector 20, but the processing device 110 may be provided in the projector 20. Specifically, the calculation method according to the present disclosure may be executed by a computer functioning as the control center of the projector 20. Similarly, the calculation method according to the second embodiment may be executed by a computer functioning as the control center of the projector 20.

(2) In the above embodiments, the projective transformation matrix and the normal vector of the projection surface SC are calculated, using the N picked-up images in which the adjustment pattern is successfully detected. However, two or more picked-up images picked up at positions spaced apart at a distance equal to or greater than a threshold may be selected from the N picked-up images, using the external parameter of the camera 130 calculated together with the normal vector, and the normal vector may be calculated, using the transformation matrix corresponding to each of the selected two or more picked-up images. This is because the calculation accuracy of the normal vector is improved more as the picked-up images picked up at positions spaced further apart from each other are used. The threshold may be determined according to the distance between the projection surface SC and the projector 20, and may be set to be a value such as an integral multiple of the distance.

(3) The first controller 111, the second controller 112, the third controller 113, and the calculator 114A in the first embodiment are all software modules. However, any one, any two, any three, or all of the first controller 111, the second controller 112, the third controller 113, and the calculator 114A may be a hardware module such as an application specific integrated circuit (ASIC). Even when any one, any two, any three, or all of the first controller 111, the second controller 112, the third controller 113, and the calculator 114A are hardware modules, the same effects as in the first embodiment are achieved. Similarly, the calculator 114B in the second embodiment may be a hardware module.

(4) The program PRA may be manufactured as a single product and may be provided for a fee or for free. Specific forms of providing the program PRA include a form in which the program PRA is written in a computer-readable recording medium such as a flash ROM and provided in this way, and a form in which the program PRA is provided by being downloaded through a telecommunication line such as the internet. Causing a general computer to operate according to the program PRA provided in these forms can cause the computer to execute the calculation method according to the first embodiment of the present disclosure. Similarly, the program PRB may be manufactured as a single product and may be provided for a fee or for free.

(5) The calculation processing SA150 in the first embodiment includes the normalization processing SA151 and the normalization processing SA152. However, the calculation processing SA150 may not include the normalization processing SA151 or the normalization processing SA152. That is, in the projective transformation calculation processing SA153, the calculator 114A may calculate the projective transformation matrix without using the internal parameter of the projector 20 or the internal parameter of the camera 130. Thus, in the projective transformation calculation processing SA153, the calculator 114A may calculate the projective transformation matrix, based on the coordinates of the first corresponding point that is not normalized and the coordinates of the second corresponding point that is not normalized. In this case, the internal parameter of the projector 20 and the internal parameter of the camera 130 are used in the homography decomposition processing SA154. In other words, the internal parameter of the projector 20 and the internal parameter of the camera 130 do not need to be used in the normalization processing SA151 or the normalization processing SA152, and may be used in one of the processes up to the estimation processing SA156, which is the process of estimating the normal vector of the projection surface SC.

4. Summary of Present Disclosure

The present disclosure is not limited to the foregoing embodiments and modification examples and can be implemented according to various aspects without departing from the spirit and scope of the present disclosure. For example, the present disclosure can also be implemented according to the following aspects. Technical features in the above embodiments corresponding to technical features in the aspects described below can be replaced or combined as appropriate, in order to solve a part or all of the problems of the present disclosure or in order to achieve a part or all of the effects of the present disclosure. Also, the technical features can be deleted as appropriate, unless described as essential in the present specification.

The present disclosure will be summarized below as appendices.

APPENDIX 1

According to an aspect of the present disclosure, a calculation method includes: projecting a pattern detectable by a camera from a projector onto a planar projection surface; based on a first picked-up image acquired by picking up an image of the pattern with the camera from a first position, calculating a first transformation matrix for transformation from one of a coordinate system of the first picked-up image and a coordinate system of the projector to the other; based on a second picked-up image acquired by picking up an image of the pattern with the camera from a second position different from the first position, calculating a second transformation matrix for transformation from one of a coordinate system of the second picked-up image and the coordinate system of the projector to the other; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector. With the calculation method according to this aspect, the normal direction of the projection surface can be accurately calculated, and therefore the correction of the shape of the projection image as viewed from the normal direction of the projection surface, that is, from the front of the projection surface, can be executed with high accuracy.

APPENDIX 2

As a more preferable aspect of the calculation method according to the present disclosure, the calculation method according to Appendix 1 further includes calculating a parameter for correcting an outer shape of an image projected by the projector, based on the estimated normal vector. With the calculation method according to this aspect, the shape of the projection image as viewed from the front of the projection surface can be corrected into a rectangular shape with high accuracy.

APPENDIX 3

As a more preferable aspect of the calculation method according to the present disclosure, the calculation method according to Appendix 1 or Appendix 2 further includes estimating an internal parameter of the camera so as to minimize a reprojection error calculated from the first transformation matrix and the second transformation matrix. With the calculation method according to this aspect, the internal parameter of the camera can be accurately calculated, for example, even when it is difficult to grasp the internal parameter of the camera in advance, such as when the camera is freely prepared by the user.

APPENDIX 4

As a more preferable aspect of the calculation method, in the calculation method according to Appendix 3, the estimating the normal vector of the projection surface includes re-estimating the normal vector, based on the first transformation matrix and the second transformation matrix re-calculated using the estimated internal parameter of the camera. With the calculation method according to this aspect, the internal parameter of the camera and the normal direction of the projection surface can be accurately calculated even when it is difficult to grasp the internal parameter of the camera in advance, and therefore the correction of the shape of the projection image when the projection surface is viewed from the front can be executed with high accuracy.

APPENDIX 5

As a more preferable aspect of the calculation method according to the present disclosure, in the calculation method according to one of Appendices 1 to 4, the camera is provided in a portable device, the portable device includes a sensor that detects a direction of gravity, and the calculation method further includes calculating a parameter for correcting an image projected by the projector so that an outer shape of the image projected onto the projection surface by the projector is a rectangle when the projection surface is viewed from the front and one side of the rectangle is along the direction of gravity, based on the direction of gravity detected by the sensor and the estimated normal vector. According to this aspect, a projection image that is straight in relation to the installation surface of the projection target object having the projection surface (for example, the ground) is acquired.

APPENDIX 6

As a more preferable aspect of the calculation method according to the present disclosure, in the calculation method according to one of Appendices 1 to 5, the estimating the normal vector includes estimating the normal vector by using a selection of two or more picked-up images picked up at positions spaced apart at a distance that is equal to or greater than a threshold from among a plurality of picked-up images including the first picked-up image and the second picked-up image, using an external parameter of the camera estimated from the first transformation matrix and the second transformation matrix. According to this aspect, the estimation accuracy of the normal vector can be improved.

APPENDIX 7

As a more preferable aspect of the calculation method according to the present disclosure, in the calculation method according to Appendix 6, the threshold is determined according to a distance between the projection surface and the projector. According to this aspect, the estimation accuracy of the normal vector can be improved in consideration of the distance between the projection surface and the projector.

APPENDIX 8

According to another aspect of the present disclosure, a non-transitory computer-readable storage medium storing a program is provided, the program causing a computer to execute: projecting a pattern detectable by a camera from a projector onto a planar projection surface; based on a first picked-up image acquired by picking up an image of the pattern with the camera from a first position, calculating a first transformation matrix for transformation from one of a coordinate system of the first picked-up image and a coordinate system of the projector to the other; based on a second picked-up image acquired by picking up an image of the pattern with the camera from a second position different from the first position, calculating a second transformation matrix for transformation from one of a coordinate system of the second picked-up image and the coordinate system of the projector to the other; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector. With the program according to this aspect, the normal direction of the projection surface can be accurately calculated, and therefore the correction of the shape of the projection image as viewed from the normal direction of the projection surface, that is, from the front of the projection surface, can be executed with high accuracy.

APPENDIX 9

According to still another aspect of the present disclosure, an information processing device includes: a communication device that communicates with a projector projecting an image on a planar projection surface; a camera that picks up the image projected on the projection surface from the projector; and a processing device, the processing device executing: projecting a pattern detectable by the camera from the projector onto the projection surface; based on a first picked-up image acquired by picking up an image of the pattern with the camera from a first position, calculating a first transformation matrix for transformation from one of a coordinate system of the first picked-up image and a coordinate system of the projector to the other; based on a second picked-up image acquired by picking up an image of the pattern with the camera from a second position different from the first position, calculating a second transformation matrix for transformation from one of a coordinate system of the second picked-up image and the coordinate system of the projector to the other; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector. With the information processing device according to this aspect, the normal direction of the projection surface can be accurately calculated, and therefore the correction of the shape of the projection image as viewed from the normal direction of the projection surface, that is, the from the front of the projection surface, can be executed with high accuracy.

What is claimed is:

1. A calculation method comprising:

projecting a pattern detectable by a camera from a projector onto a planar projection surface;

based on a first picked-up image acquired by picking up an image of the pattern with the camera from a first position, calculating a first transformation matrix for transformation from one of a coordinate system of the first picked-up image and a coordinate system of the projector to another;

based on a second picked-up image acquired by picking up an image of the pattern with the camera from a second position different from the first position, calculating a second transformation matrix for transformation from one of a coordinate system of the second picked-up image and the coordinate system of the projector to another; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector.

2. The calculation method according to claim 1, further comprising:

calculating a parameter for correcting an outer shape of an image projected by the projector, based on the estimated normal vector.

3. The calculation method according to claim 1, further comprising:

estimating an internal parameter of the camera so as to minimize a reprojection error calculated from the first transformation matrix and the second transformation matrix.

4. The calculation method according to claim 3, wherein the estimating the normal vector of the projection surface includes re-estimating the normal vector, based on the first transformation matrix and the second transformation matrix re-calculated using the estimated internal parameter of the camera.

5. The calculation method according to claim 1, wherein the camera is provided in a portable device, the portable device includes a sensor that detects a direction of gravity, and the calculation method further comprises calculating a parameter for correcting an image projected by the projector so that an outer shape of the image projected onto the projection surface by the projector is a rectangle when the projection surface is viewed from the front and one side of the rectangle is along the direction of gravity, based on the direction of gravity detected by the sensor and the estimated normal vector.

6. The calculation method according to claim 1, wherein the estimating the normal vector includes estimating the normal vector by using a selection of two or more picked-up images picked up at positions spaced apart at a distance that is equal to or greater than a threshold from among a plurality of picked-up images including the first picked-up image and the second picked-up image, using an external parameter of the camera estimated from the first transformation matrix and the second transformation matrix.

7. The calculation method according to claim 6, wherein the threshold is determined according to a distance between the projection surface and the projector.

8. A non-transitory computer-readable storage medium storing a program, the program causing a computer to execute:

projecting a pattern detectable by a camera from a projector onto a planar projection surface;

based on a first picked-up image acquired by picking up an image of the pattern with the camera from a first position, calculating a first transformation matrix for transformation from one of a coordinate system of the first picked-up image and a coordinate system of the projector to another;

based on a second picked-up image acquired by picking up an image of the pattern with the camera from a second position different from the first position, calculating a second transformation matrix for transformation from one of a coordinate system of the second picked-up image and the coordinate system of the projector to another; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector.

9. An information processing device comprising:

a communication device that communicates with a projector projecting an image on a planar projection surface;

a camera that picks up the image projected on the projection surface from the projector; and a processing device, the processing device executing:

projecting a pattern detectable by the camera from the projector onto the projection surface;

based on a first picked-up image acquired by picking up an image of the pattern with the camera from a first position, calculating a first transformation matrix for transformation from one of a coordinate system of the first picked-up image and a coordinate system of the projector to another;

based on a second picked-up image acquired by picking up an image of the pattern with the camera from a second position different from the first position, calculating a second transformation matrix for transformation from one of a coordinate system of the second picked-up image and the coordinate system of the projector to another; and estimating a normal vector of the projection surface, based on a first normal vector of the projection surface calculated based on the first transformation matrix, a second normal vector of the projection surface calculated based on the second transformation matrix, an internal parameter of the camera, and an internal parameter of the projector.

* * * * *